May 11, 1954

C. R. DE NARDIS 2,678,073

VEGETABLE CUTTER AND SHREDDER

Filed Sept. 7, 1950

INVENTOR.
CORNELIUS R. De NARDIS
BY
ATTORNEY

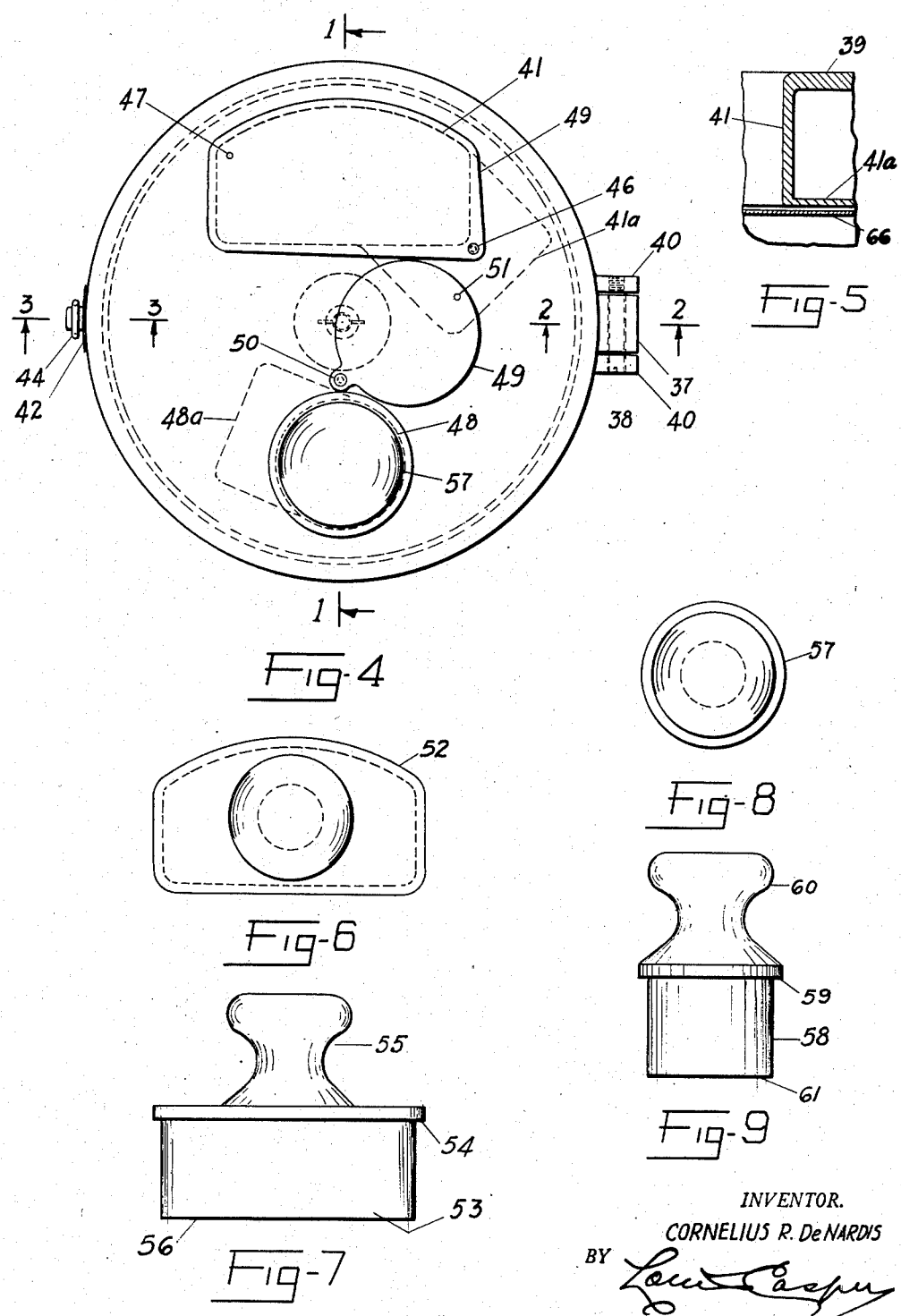

May 11, 1954

C. R. DE NARDIS 2,678,073

VEGETABLE CUTTER AND SHREDDER

Filed Sept. 7, 1950

INVENTOR.
CORNELIUS R. DeNARDIS
BY
ATTORNEY

Patented May 11, 1954

2,678,073

UNITED STATES PATENT OFFICE 2,678,073

VEGETABLE CUTTER AND SHREDDER

Cornelius R. De Nardis, Elmhurst, N. Y.

Application September 7, 1950, Serial No. 183,563

3 Claims. (Cl. 146—125)

This invention relates to a kitchen utility device of the type that is adapted to shred, grate or slice vegetables including leafy vegetables such as cabbage and the like, and also stalk-like vegetables such as celery and carrots.

An object of this invention is to provide such manner of device that can be used to shred or slice vegetables of all kinds, including the bulky, leafy kind as well as stalk-like vegetables, in a comparatively simple manner.

Another object of this invention is to provide a device simple in construction, and having comparatively few parts, and without any interposing gearing in its operation, and which is relatively inexpensive of manufacture, and furthermore, being sturdy and rugged and having a wide range of utilization.

In the preferred embodiment as illustrated in the drawings, the invention is shown as a shredder driven primarily by an electric motor, and the present description therefore is confined to such illustrated embodiment of the invention. It will be undertsood, however, that the novel features of the invention and improvements thereon are susceptible to other applications, such, for example, as a shredder or slicer which is driven by other motive means than that which is shown, or it may be hand-driven. Hence, the scope of this invention may not be regarded as confined strictly to the embodiment herein shown and described.

In the accompanying drawings forming part of this specification, the preferred embodiment of my invention is shown, in which:

Fig. 4 is a plan view of the device;

Fig. 5 is a detail view showing the position of the shredder plate in the device;

Fig. 6 is a plan view of the pusher element;

Fig. 7 is an elevation thereof;

Fig. 8 is a plan view of another pusher used in the device;

Fig. 9 is an elevational view thereof;

Figure 10:
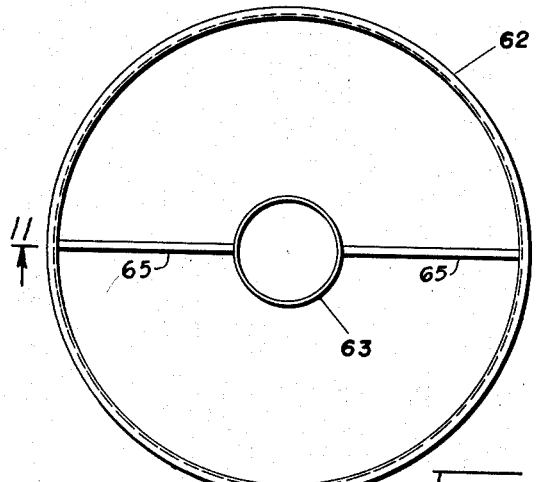
Fig. 10 is a plan view of the pulp and juice container.
Figure 11:
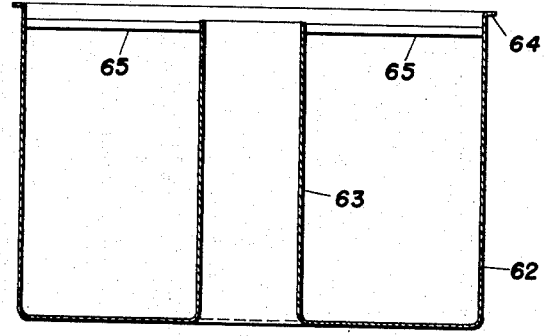
Fig. 11 is a section thereof on the line 11—11 of Fig. 10.
Figure 12:
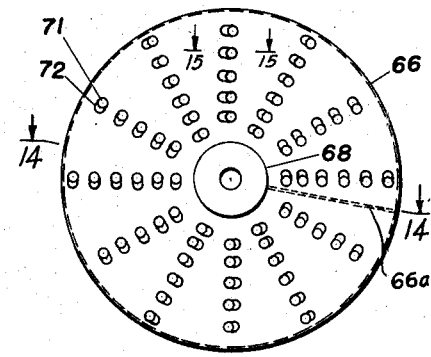
Fig. 12 is a cutting and shredder plate or disc.
Figure 13:
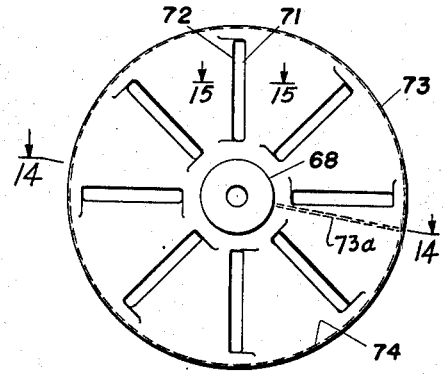
Fig. 13 is another type of cutting and shredder plate or disc.
Figure 15:
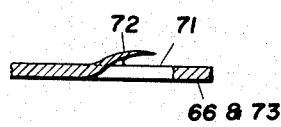
Figure 14:
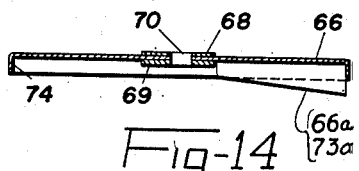

Fig. 14 is a sectional detail view of the cutting and shredder plate taken on the line 14—14 of Figs. 10, 12 and 13; and Fig. 15 is a detail of a cutting edge of either disc or plate shown in Figs. 12 and 13.

Referring to the drawings, in which like parts are indicated by like reference characters, 20 is a housing of cylindrical or other desired shape and having a lower compartment 21 to house motor 24, said motor being secured in position beneath the middle wall 22 of the housing 20 by means of screws 25 screwed through the motor supporting plate 24a. The said motor 24 is provided with a shaft 26, the upper portion of which is shouldered and provided with a threaded end 28 and upon which is screwed the wing nut 27. The shaft 26 passes through a shaft bore 22a, said bore having bushings 29 and ball bearing 30 therein, which are provided for smooth and efficient rotation of said shaft 26. A cooling and ventilating fan blade unit 24b is mounted on the lower portion of the shaft 26.

31 are semi-round supporting legs extending from the top of the middle wall 22 of the housing 20 to the bottom thereof. The bases of said legs 31 are provided with felt discs or other like material 32, and which are secured in place by means of screws 33, said discs being provided to avoid scratching or marring a polished or other surface upon which the device may be placed.

Figures 1, 2, 3:
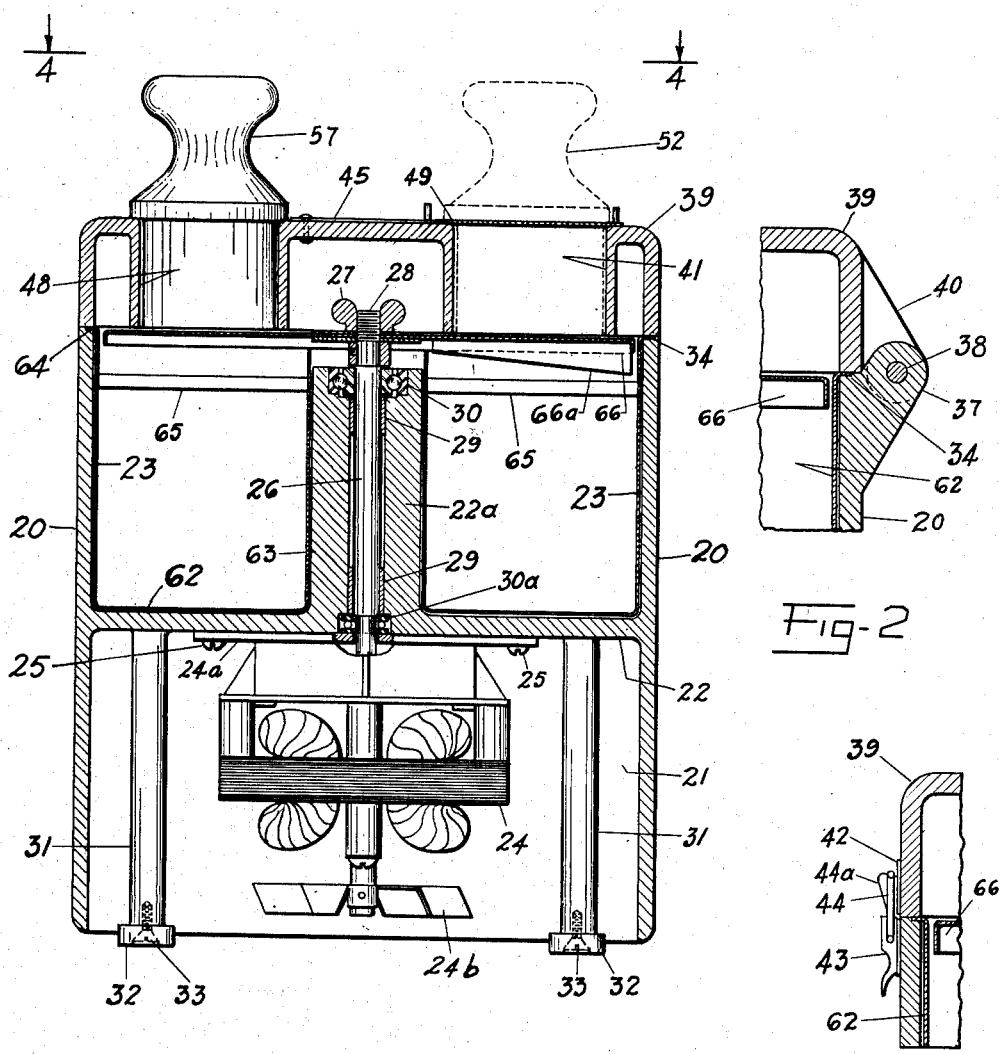
Fig. 1 is a cross-section of a kitchen utility device embodying this invention, showing the shredder unit in operative position.
Fig. 2 is a detail of the device showing the cover hinging arrangement on the line 2—2 of Fig. 4.
Fig. 3 is a detail of the device showing the manner of locking the cover thereof on the line 3—3 of Fig. 4.

The housing 20, as shown in Fig. 1, is further provided with an upper compartment 23 having a shoulder 34 to which is secured a cover 39, said cover also serving the purpose to securely hold and prevent the receptacle 62 underneath it from vibrating when said motor is in operation when said cover 39 is in closed position and the device is performing its shredding and grating functions.

37 is an extension of the housing 20. 38 is a pin which is inserted through the hinge 40, said hinge being an integral part of the cover 39.

The cover 39 has preferably two apertures or openings, the larger aperture 41 (Fig. 4) being used for an entrance into the device of such kind of bulky vegetable as cabbage. The smaller aperture 48 is provided for the entrance into the device of such vegetables as celery, carrots, and so forth.

42 is the upper portion of a snap lock 44a, and which portion is attached to the cover 39. 43 is the lower portion of said snap lock 44a and the finger hold portion thereof forming part of said lock; said catch 44 being looped over the shoulder extension of the upper portion of the lock 42 which, when so looped, secures the top cover 39 in a closed and locked position over the housing 20.

A sliding cover plate or lid 49 is situated on the top of the cover 39, and which swings on a horizontal plane in its pivot bearing 46. A short handle 47 is provided on said cover 49 for the hand movement thereof in the manner stated. The foregoing opening and sliding plate therefor being approximately oblong in shape to permit larger vegetable stalks for insertion into the housing 20.

Another sliding cover plate 45 is situated on the cover 39 as shown in Fig. 2, and which swings on a horizontal plane on its pivot bearing 50. A short handle 51 is also provided on said cover similar to that of the handle on the cover 49. The cover plate 49 covers aperture 41 and cover plate 45 covers aperture 48. The aforesaid circular opening is for insertion of smaller stalks. In this manner greater efficiency of operation may be obtained by having an opening for larger vegetable stalks and an opening for smaller stalks, and the convenience of sliding the lid over the opening that is not being used.

Referring to Figs. 6 and 7 and Figs. 8 and 9 which illustrate two types of plungers or pushers used in connection with the shredding device. The pusher 52 is provided with a shoulder 54 which prevents said pusher from entering the aperture 41 any further than is necessary for the shredding or grating operation. 53 is the lower portion of said pusher and 56 is the bottom section thereof, which surface contacts with and presses against the vegetable or other food material that may be contained in the chamber below said aperture 41. 55 is the upper portion of said pusher, the latter being used as a handle by the user of the shredder device.

In Figs. 8 and 9 is shown the pusher 57 having a shoulder 59, which shoulder prevents said pusher from entering the aperture 48 any further than necessary. 58 is the lower portion which enters the aperture, and 61 is the lower surface of the pusher that contacts with whatever vegetable material may be contained in the chamber below the aperture 41. 60 is the handle or hand-hold of said pusher 57.

Referring to Fig. 1, in said figure is shown a receptacle 62 for the reception of the grated or shredded vegetables. Said receptacle rests in the cylindrical space or opening 63 of said housing 20. Said receptacle 62 has a flanged or supporting portion 64 on the upper rim thereof.

A straddling handle 65 is provided at the top of the receptacle 62 to provide means for lifting and for placing said receptacle in the upper compartment 23 for emptying the contents thereof, or for cleaning. In any event, the receptacle 62 may be readily removed from the upper compartment 23 for any purpose.

A shredder disc or plate 66 is mounted on shaft 26 and above said receptacle 62, as shown in Fig. 1. Said shredder disc 66 is provided with openings 71 and cutting edges 72 contiguous to said openings (see Fig. 12).

Another or alternate shredder disc 73 (Fig. 13) is provided for the purpose of shredding and slicing leafy vegetables and such like. The cutting knives 71 are in encircled position on the disc 73, with contiguous openings as described, said openings to allow shredded material and juice thereof to fall into the receptacle 62 below said disc 73. 41a (Fig. 5) is an auxiliary extension underneath the apertures 41 and 48 and is for the purpose of preventing the unshredded portions of the vegetables from escaping from the discs 66 and 73 without being cut and shredded.

Illustrations showing detail portions of the cutters and openings contiguous thereto may be seen in Figs. 13 and 15.

Both shredder discs 66 and 73 are provided with turned down edges 74 as shown in Figs. 12 and 13.

The plates 66 and 73 are provided with leveling extensions 66a and 73a, respectively, for the purpose of leveling the shredded and cut vegetable material and thus prevent any of said material from accumulating at any one part of the receptacle 62 and underneath the cutting and shredder discs or plates in said device, and thus provide for an even distribution of all the shredded vegetable material. If the foregoing is not done as stated, the shredded material would tend to pile up at one point and would therefore tend to clog up the inside of said receptacle.

Either of the shredder discs 66 or 73 may be readily mounted or removed, or interchanged in the device 20. These removals or mountings are made by unscrewing the wing nut 27 and placing either one of the discs over the shaft 26 and replacing the wing nut 27 over the threaded portion 28 of the shaft 26 and then screwing said wing nut tightly over said shaft.

From the foregoing description it will be seen that a vegetable or like shredder and grater device is shown that is simple, efficient and having moving parts limited only to that of the armature shaft 26 of the motor 24, and the shredder disc connected thereto.

It will also be apparent that this invention is capable of other modifications than that described, and I therefore do not limit myself to the description herein made, being only limited by the scope of the appended claims.

I claim:

1. A food shredder comprising a vertically disposed housing, a cover hinged on said housing and formed with a vertically extending eccentrically positioned open ended passageway, an annular open topped receptacle positioned within said housing adjacent the upper end thereof, a motor mounted below said receptacle and having a vertically disposed shaft extending centrally through and beyond the upper end of said receptacle, a horizontal plate disposed over said receptacle adjacent the lower end of said passageway and secured to said shaft for rotative movement therewith, said plate being formed with a plurality of radially disposed through slots, a horizontally disposed cutting edge extending along each of said slots and fixedly secured to the adjacent portion of said plate, each of said edges being spaced above said plate, and a radially extending vertically depending leveling extension on said plate intermediate an adjacent pair of said slots, said leveling extensions tapering toward the center of said plate.

2. A food shredder comprising a vertically disposed housing, a cover hinged on said housing and formed with a vertically extending eccentrically positioned open ended passageway, an annular open topped receptacle positioned within said housing adjacent the upper end thereof, a motor mounted below said receptacle and having a vertically disposed shaft extending centrally through and beyond the upper end of said receptacle, a horizontal plate disposed over said receptacle adjacent the lower end of said passageway and secured to said shaft for rotative movement therewith, said plate being formed with a plurality of radially disposed through slots, a horizontally disposed cutting edge extending along each of said slots and fixedly secured to the adjacent portion of said plate, each of said edges being spaced above said plate, and a radially extending vertically depending leveling extension on said plate intermediate an adjacent pair of said slots, said leveling extensions tapering toward the center of said plate, and a hand actuable pusher insertable into said passageway for holding food particles against said plate in the path of said cutting edges.

3. A food shredder comprising a vertically disposed housing, a cover hinged on said housing and formed with a vertically extending eccentrically positioned open ended passageway, an annular open topped receptacle removably positioned within said housing adjacent the upper end thereof, a handle extending across said receptacle adjacent its upper end, a motor mounted below said receptacle and having a vertically disposed shaft extending centrally through and beyond the upper end of said receptacle, a horizontal plate disposed over said receptacle adjacent the lower end of said passageway and secured to said shaft for rotative movement therewith, said plate being formed with a plurality of radially disposed through slots, a depending peripheral flange on said plate adjacent to the wall of said receptacle, a horizontally disposed cutting edge extending along each of said slots and fixedly secured to the adjacent portion of said plate, each of said edges being spaced above said plate, and a radially extending vertically depending leveling extension on said plate intermediate an adjacent pair of said slots, said leveling extensions tapering toward the center of said plate.

References Cited in the file of this patent

UNITED STATES PATENTS

| Number | Name | Date |
|---|---|---|
| 278,827 | Schrebler | June 5, 1883 |
| 285,985 | Fishel | Oct. 2, 1883 |
| 931,295 | Hagemeyer | Aug. 17, 1909 |
| 1,964,290 | Krause | June 26, 1934 |
| 2,169,323 | Martinet | Aug. 15, 1939 |
| 2,227,098 | MacLean | Dec. 31, 1940 |
| 2,273,093 | Drachenberg | Feb. 17, 1942 |
| 2,280,214 | Buerk | Apr. 21, 1942 |
| 2,481,010 | Gundelfringer | Sept. 6, 1949 |